US 12,305,244 B2

(12) United States Patent
Christie

(10) Patent No.: US 12,305,244 B2
(45) Date of Patent: May 20, 2025

(54) ELEMENTS FOR SYRUP-MAKING EVAPORATORS HAVING ANTI-NITER-BUILDUP TEXTURING, EVAPORATORS INCORPORATING SAME, AND RELATED METHODS

(71) Applicant: Maple Expert Solutions, Inc., Henniker, NH (US)

(72) Inventor: Clayton G. Christie, Jefferson, NH (US)

(73) Assignee: Maple Expert Solutions, Inc., Henniker, NH (US)

( * ) Notice: Subject to any disclaimer, the term of this patent is extended or adjusted under 35 U.S.C. 154(b) by 241 days.

(21) Appl. No.: 18/209,095

(22) Filed: Jun. 13, 2023

(65) Prior Publication Data

US 2023/0407420 A1    Dec. 21, 2023

Related U.S. Application Data

(60) Provisional application No. 63/352,452, filed on Jun. 15, 2022.

(51) Int. Cl.
| | |
|---|---|
| *C13B 25/04* | (2011.01) |
| *B01D 1/00* | (2006.01) |
| *B01D 1/02* | (2006.01) |
| *B01D 1/30* | (2006.01) |
| *C13B 25/00* | (2011.01) |

(52) U.S. Cl.
CPC ............ *C13B 25/04* (2013.01); *B01D 1/0082* (2013.01); *B01D 1/02* (2013.01); *B01D 1/30* (2013.01); *C13B 25/005* (2013.01)

(58) Field of Classification Search
CPC ..... C13B 25/00; C13B 25/001; C13B 25/003; C13B 25/005; C13B 25/02; C13B 25/04; B01D 1/0082; B01D 1/02; B01D 1/30
See application file for complete search history.

(56) References Cited

U.S. PATENT DOCUMENTS

| | | | |
|---|---|---|---|
| 2012/0152236 A1* | 6/2012 | Bilodeau | C13B 25/02 127/46.1 |
| 2016/0010164 A1* | 1/2016 | Caux | A23L 29/30 127/9 |
| 2023/0124058 A1* | 4/2023 | Peters | B01D 1/06 202/180 |

FOREIGN PATENT DOCUMENTS

| | | | | |
|---|---|---|---|---|
| WO | WO-2018095978 A1 * | 5/2018 | | |
| WO | WO-2018143885 A1 * | 8/2018 | | B01D 1/06 |

* cited by examiner

*Primary Examiner* — Renee Robinson
(74) *Attorney, Agent, or Firm* — Downs Rachlin Martin PLLC

(57) ABSTRACT

Elements having surfaces that are submerged in sap during evaporation processes for producing syrup and that have anti-niter-buildup textures designed, configured, and provided to inhibit buildup of hard-to-remove niter deposits that tend to form on such surfaces. In some embodiments, anti-niter-buildup texture is provided to reduce the amount of contact between niter particles in the sap and the surfaces, for example, by controlling (e.g., minimizing) the number of contact points and/or minimizing the contact area, between each particle and the surface. Anti-niter-buildup texture may be provided to a surface of an element in any suitable way, such as machining, coating, etching, and peening, among others, and any combination thereof. Syrup-making evaporators and evaporation system incorporating such elements are also disclosed, as are method of making elements for evaporator and method of making evaporators.

22 Claims, 4 Drawing Sheets

ELEMENTS FOR SYRUP-MAKING EVAPORATORS HAVING ANTI-NITER-BUILDUP TEXTURING, EVAPORATORS INCORPORATING SAME, AND RELATED METHODS

RELATED APPLICATION DATA

This application claims the benefit of priority of U.S. Provisional Patent Application Ser. No. 63/352,452, filed Jun. 15, 2022, and titled "ELEMENTS FOR SYRUP-MAKING EVAPORATORS HAVING ANTI-NITER-BUILDUP TEXTURING, EVAPORATORS INCORPORATING SAME, AND RELATED METHODS", which is incorporated herein by reference in its entirety.

FIELD

The present disclosure generally relates to the field of producing syrup from sap. In particular, the present disclosure is directed to elements for syrup-making evaporators having anti-niter-buildup textures, evaporators incorporating same, and related methods.

BACKGROUND

Steam pipes/tubes, often called "coils," are the conduits inside a steam evaporator used for evaporating water from sap to make syrup, such as maple syrup. These conduits are submerged in the sap/syrup, and low or high pressure steam is forced through them to heat the sap/syrup. The heating coils are the heat transfer vehicle from a steam boiler to the sap/syrup.

When boiling-down maple sap to make maple syrup, a combination of differing minerals precipitate from the sap as a byproduct called "niter". This niter generally clings to the heating surfaces that are submerged in the sap/syrup during the boiling process. The buildup of niter on the heating surfaces insulates them from the maple sap and causes the boiling process to be energy inefficient. In a traditional evaporator, which has flat pans, the niter sticks to submerged pan surfaces. In a steam-powered evaporator, the niter sticks to the submerged heating coils.

In the maple-syrup industry it has long been taught that the smoother the surface, the lower the resistance to heat transfer. Evaporator pans are wanted to be as smooth as possible. Steam evaporation techniques have been known for many years, and the maple-syrup industry is gradually switching from traditional pan evaporation to steam evaporation. There are many factors for this switch, but the one in particular is the reduction in cleaning. Heating coils clean much easier and quicker than a flat pan. However, niter buildup is still an issue with heating coils.

SUMMARY

In an implementation, the present disclosure is directed to an evaporator for making syrup from sap. The evaporator includes a vessel for containing the sap during heating of the sap during an evaporation process for concentrating the sap to syrup; and an element that has a surface submerged in, and in contact with, the sap during the evaporation process, wherein the surface has an anti-niter-buildup texture designed, configured, and provided to inhibit niter from bonding to the surface during the evaporation process.

BRIEF DESCRIPTION OF THE DRAWINGS

For the purpose of illustration, the accompanying drawings show aspects of one or more embodiments made in accordance with the present disclosure. However, it should be understood that the scope of this disclosure is/are not limited to the precise arrangements and instrumentalities shown in the drawings, wherein.

DETAILED DESCRIPTION

Overview

Figure 1A:
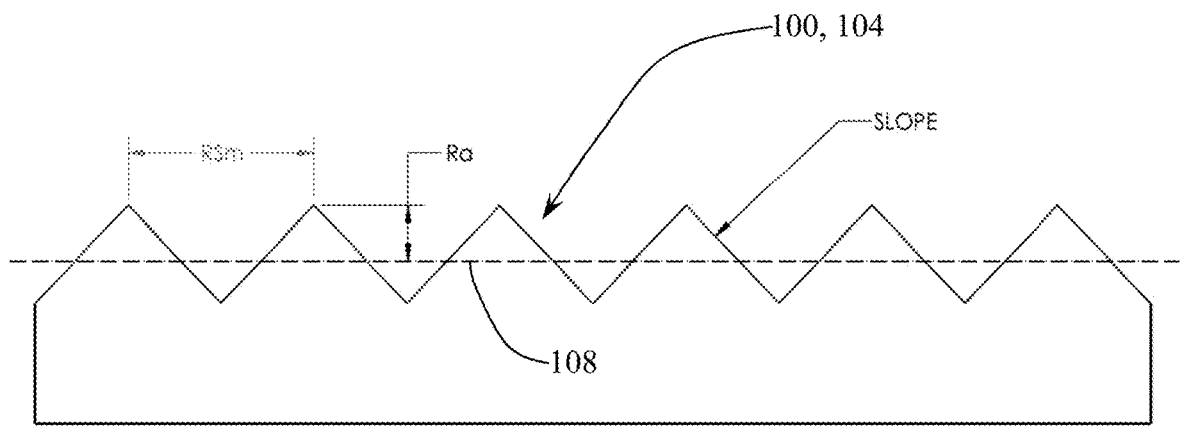
FIG. 1A is a diagram illustrating an example two-dimensional (2D) peak-and-valley surface profile that can be used as an anti-niter-buildup texture in accordance with the present disclosure.

In some aspects, the present disclosure is directed to elements specifically designed and configured for use in heating sap in the evaporation process of making syrup from the sap. The present inventor has unexpectedly discovered, contrary to conventional wisdom in the maple-syrup-production industry, that surfaces of heating conduit and other elements exposed to sap/syrup during a sap-boiling process that have a special non-smooth surface profile, or texture, display the properties of inhibiting buildup of niter and, when niter particles do adhere to the elements, permit easy cleaning. Another benefit of a specially textured surface of the present disclosure is that the heat-transfer rate of heating conduit and/or other heating element(s) having such textured surfaces is increased, not only because of the reduced amount of niter buildup on the heating conduit but also because of the increased surface area of the heating conduit due to the surface texture. For the sake of convenience, distinction, and emphasis, this special surface texture is referred to herein as an "anti-niter-buildup texture" due to its functionality. It is noted that providing an anti-niter-buildup texture of the present disclosure to an element is an intentional act. That is, a designer, builder, etc., is motivated to provide the anti-niter-buildup texture based on an explicit recognition that a particular element is known, or at least suspected, to experience niter buildup during use. Examples of suitable anti-niter-buildup textures and considerations for designing and providing such textures are discussed below.

As noted in the Background section above, niter precipitates out of sap/syrup during boiling as the sap/syrup is heated during syrup production. Niter is composed of an array of chemical elements but, in maple sap for example, the most abundant one is calcium. The calcium is what makes niter such a challenging aspect of boiling maple sap/syrup to concentrate the sap into syrup. When the calcium reacts with carbon dioxide ($CO_2$) that is in maple sap due to off-gassing from the maple trees producing the sap, calcium carbonate ($CaCO_3$) is formed. Calcium carbonate can have various coarseness levels, and the coarseness of the calcium carbonate in maple syrup is typically classified as "coarse."

Unprocessed maple sap has a high solubility relative to calcium and calcium carbonate. When boiling it down to maple syrup, there comes a point at which the liquid sap becomes saturated and the calcium carbonate precipitates out of the sap. This generally happens when the temperature of the maple sap is above about 216° F. That said, it is noted that this precipitation temperature can change depending on the concentration of the niter in the sap and the boiling method used, so this is generally not standard with every situation. Based on a statistical analysis of one batch of coarse calcium carbonate obtained from a boil, about 94% of the samples taken from this batch had precipitated niter particles greater than about 10 μm in size. That said, those skilled in the art will readily appreciate that the sizes of precipitated niter particles can vary from one batch to another batch, from one sap type to another sap type, from one boiling process to another boiling process, from one set of boiling parameters to another set of boiling parameters, etc.

While maple-syrup production is a primary focus of the present disclosure, those skilled in the art will readily appreciate that saps and syrups can be any suitable saps and syrups, such as birch saps and syrups, among others. Also, the term "heating conduit" is used to cover any type of structure that carries a heating fluid for the purpose of heating sap/syrup in an evaporator. Examples of heating conduit include, but are not limited to, heating tubes, heating pipes, heating coils, as well as passageways and corresponding surrounding portions of structure (e.g., evaporator vessel walls), among others, that carry a heating fluid for driving evaporation. The heating fluid can be any suitable type of fluid for performing the function of heating the sap/syrup during evaporation, such as, but not limited to, steam, compressed steam, and superheated water, among others, and any logical combination thereof. Fundamentally, there are no limitations on the type of working fluid.

The term "element" as used herein and in the appended claims refers to any structure that may have or be provided with an anti-niter-buildup texture of the present disclosure. An "element" can be any component, or portion thereof, of a system (e.g., evaporator) for boiling or otherwise heating sap/syrup and that is exposed to the sap/syrup during heating. Examples of such elements include, but are not limited to, heating conduits that carry a heating fluid, such as steam, vessel walls incorporating internal heating passageways that carry a heating fluid, vessel walls having external (e.g., jacketed type, wrapped type) heating elements such as fluid-carrying conduit and/or electrically resistive heating elements, unheated vessel walls, heating-conduit supports, internal vessel dividers, and/or any other component, or portion thereof, of a syrup-production system that is submerged in the sap/syrup during a heating process.

In some aspects, the present disclosure is directed to evaporators that incorporate one or more elements that each include an anti-niter-buildup texture of the present disclosure and that is/are submerged or at least partially submerged in the niter-producing liquid (e.g., sap, syrup, or an intermediate therebetween (collectively and individually referred to herein as "sap/syrup")). An evaporator of the present disclosure may comprise one or more evaporation vessels having any suitable form, such as a vertical cylinder, or tank-type, or a pan, among others. Fundamentally, there are no limitations on the evaporation vessel in terms of form, shape, size, and configuration.

In some aspects, the present disclosure is directed to methods of making an element having an anti-niter-buildup texture of the present disclosure. In some embodiments, a method of making such an element of the present disclosure includes providing an anti-niter-buildup texture to a surface of the element that will be submerged in sap/syrup during a process of making syrup.

In some aspects, the present disclosure is directed to methods of building an evaporator for making syrup from sap. In some embodiments, a method of building an evaporator of the present disclosure includes selecting an element of the evaporator having an anti-niter-buildup texture based on an ability of the anti-niter-buildup texture to inhibit bonding of niter to the element and then installing the selected element into an evaporator vessel.

The foregoing and other aspects are described below, illustrated in the appended drawings, and/or exemplified in the appended claims, which are incorporated in this Detailed Description section as if presented in this section.

As used herein and in the appended claims, the term "about" when used with a corresponding numeric value refers to ±20% of the numeric value, typically ±10% of the numeric value, often ±5% of the numeric value, and most often ±2% of the numeric value. In some embodiments, the term "about" can mean the numeric value itself. In certain embodiments, where applicable, the term "about" indicates the designated value(s)±one standard deviation of that/those value(s).

As noted above, an important feature of a sap-/syrup-contacting element of a syrup-production system of the present disclosure is the presence of an anti-niter-buildup texture on one or more surfaces of one or more elements that is/are in contact with the sap/syrup during a heating process, such as during an evaporation process that concentrates the sap. An anti-niter-buildup texture of the present disclosure may be described as having the characteristic of reducing the contact area between a precipitated niter particle and a surface of an element submerged in the sap/syrup. Such a reduction in contact area can result in at least some niter particles not adhering to the surface. When niter particles do adhere to the surface, they are loosely adhered by way of a reduced contact area between the particles and the surface due to the profile of the anti-niter-buildup texture, and as buildup continues, it can be easily removed. Buildup of niter particles on a surface having an anti-niter-buildup texture can be removed, for example, by causing the buildup to break up and flake off of the surface, such as via vibration, impact, or mechanical action, such as brushing with a brush having suitably stiff bristles, among other things, and any useful combination thereof.

Figure 1B:
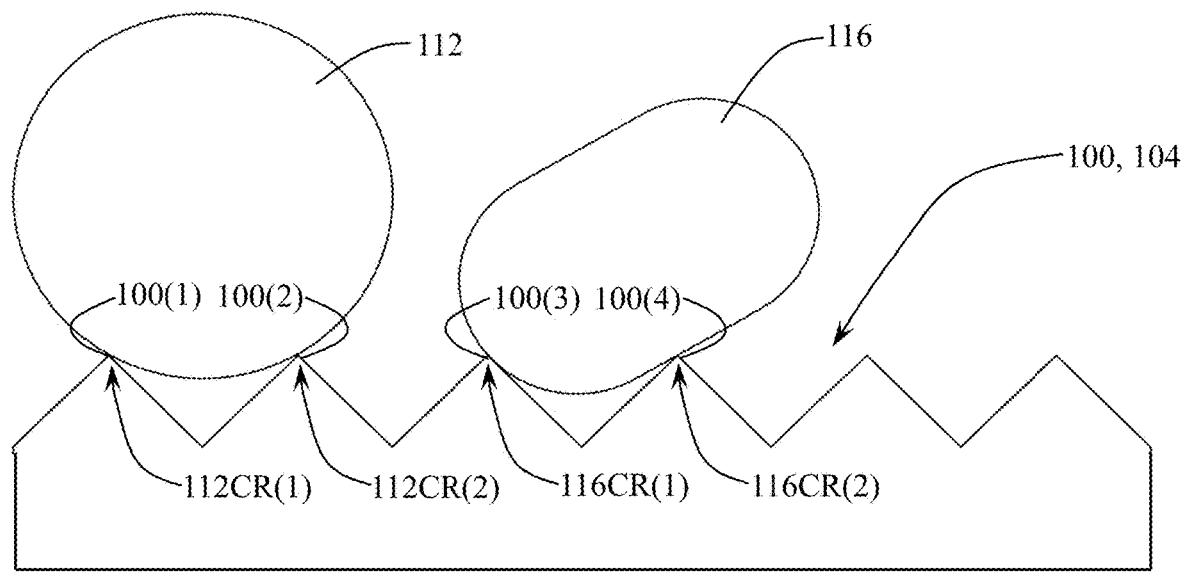
FIG. 1B is a diagram illustrating the example 2D peak-and-valley surface profile of FIG. 1A with niter particles present to illustrate an example concept of how the surface profile provides its anti-niter-buildup nature.

FIGS. 1A and 1B illustrate an example idealized 2-dimensional (2D) texture profile 100 of an anti-niter-buildup texture 104 of the present disclosure. Those skilled in the art of surface texturing will recognize that the illustrations in FIGS. 1A and 1B are idealized and not necessarily exactly representative of an actual texture profile. For example, an actual texture profile can be made in any of many differing ways as discussed below, and the inherent nature of the texture-forming process used, imprecision in the texture forming, and/or natural variations in the forming process used can cause the actual texture profile to vary from the idealized texture profile 100 shown. In addition, the profile 100 of FIGS. 1A and 1B is illustrated in a 2D form and, therefore, does not convey any information about the profile of the anti-niter-buildup texture 104 in the third dimension, i.e., the dimension in the direction into and out of the page containing these figures. However, it is noted that the profile in the third dimension can be the same as, similar to, or differing from the 2D texture profile 100 shown.

Examples of profiles in the third dimension being the same as or similar to the 2D texture profile 100 shown result in surface textures that include, but are not limited to, knurled surface textures having patterns of intersecting crisscrossing valleys that define generally pyramidal peaks, discrete-depression-type surface textures (e.g., dimpled surface textures and pitted surface textures) that can be formed, for example, by subtractive manufacturing methods (e.g., machining (mechanical, electrical, laser, etc.) and etching, among others), and/or impact methods, and added-peak surface textures that can be formed, for example, by additive manufacturing methods (e.g., particulate spraying, chemical vapor deposition, silk-screening, 3D printing, and discrete-element bonding, among others). Examples of profiles in the third dimension being different from the 2D texture profile 100 shown result in surface textures that include, but are not limited to, parallel-groove/parallel-channel surface textures (e.g., for cylindrical surfaces, purely circumferential or pitched) that can be formed, for example, by subtractive manufacturing methods (e.g., machining (mechanical, electrical, laser, etc.) and etching, among others), and/or impact methods and parallel-peak surface textures (e.g., for cylindrical surfaces, purely circumferential or pitched) that can be formed, for example, by additive manufacturing methods (e.g., chemical vapor deposition, silk-screening, 3D printing, and discrete-element bonding (e.g., for cylindrical surfaces, via winding a wire or filament around the surface), among others).

FIG. 1A shows two surface-roughness parameters commonly used for characterizing textured/roughened surfaces having relatively small (e.g., sub-20 μm) feature dimensions. Generally, FIG. 1A shows a series of peaks and valleys on the surface of an element, along with the corresponding parameters RSm and Ra.

RSm is generally known as the "mean peak width," which is the mean of the individual peak-to-peak distances of a surface profile. In this connection, it is noted that FIG. 1A shows the peaks and valleys to be uniform with all of the peak-to-peak and valley-to-valley distances appearing identical. This need not be the case. Rather some or all of the peak-to-peak (and valley-to-valley distances) may differ from one another. When this is the case, all of such peak-to-peak distances are added-up and divided by the number of the distances considered to obtain the mean peak-to-peak distance, or RSm.

Ra is generally known as the "arithmetic mean roughness value," which is the arithmetic mean of the absolute values of the distances from the tips of the peaks to a mean line of roughness (here, the horizontal dashed line 108 in FIG. 1A). Similar to the peak-to-peak distances illustrated in FIG. 1, all of the peaks are shown as having the same tip-to-mean-line-of-roughness distance, but this may not be the case. If not, all of such tip-to-mean-line-of-roughness distances are added-up and divided by the number of the distances considered to obtain the arithmetic mean roughness value, or Ra. In the example shown, each roughness feature has a pair of slopes each extending from a tip of its peak to, respectively, the bottoms of the immediately adjacent valleys.

To emphasize points noted above, the peaks and valleys illustrated in FIG. 1A can represent any of a wide variety of surface textures, such as grooved textures, knurled textures, and particulate-based textures, (e.g., solid particles in a liquid coating), among others. It is also noted that peak tips need not be pointed as shown. For example, the peak tips may be plateaued or rounded, among other things, and any combination thereof, and the shapes of the peak tips may vary from one peak to another peak. Further, the valley bottoms need not have the sharp reentrant shape shown. For example, they, too, can be curved or flat, among other things, or any combination thereof, and the valley bottoms can vary from one valley to another valley. Those skilled in the art will readily appreciate the variety of actual textures that the idealized texture profile 100 of FIG. 1A can represent.

Relative to the overarching principle of reducing contact area between niter particles and an anti-niter-buildup texture of the present disclosure, FIG. 1B illustrates this principle relative to two example niter particles 112 and 116 and the texture profile 100 of FIG. 1A. In one example, the niter particles 112 and 116 are taken to have a maximum particle dimension of 10 μm. In order to minimize or otherwise reduce the contact area between each niter particle 112 and 116 and the anti-niter-buildup surface texture 104, the texture features of the texture profile 100 may be sized, shaped, and spaced from one another by a distance, here RSm, and have an Ra, that allows each particle to contact the anti-niter-buildup surface texture at a minimal number of contact regions, such as the two contact regions 112CR(1), 112CR(2), 116CR(1), and 116CR(2) shown, respectively, for each of the two particles 112 and 116 in FIG. 1B at the corresponding respective pairs of peaks 100(1) through 100(4). Generally, this means providing an RSm that is less than the relevant particle size and an Ra that, along with the shapes of the features, inhibits any part of the particles 112 and 116 from contacting the relevant slopes of the texture features. In some embodiments, the relevant particle size or dimension can be any suitable particle size/dimension, such as a mean minimum particle size/dimension, DMm, or a minimum particle size/dimension that represents the smallest particle size/dimension, Ds, that is desired to have contact minimized, i.e., contact the texture features only at the tips of the peaks of the texture features.

If either DMm or Ds is used (the "/" in "DMm/Ds" in this paragraph stands for "or"), then in some embodiments RSm<about DMm/Ds, RSm<about 0.9 (DMm/Ds), RSm<about 0.8 (DMm/Ds), RSm<about 0.7 (DMm/Ds), RSm<about 0.6 (DMm/Ds), or RSm<about 0.5 (DMm/Ds), 0.4 (DMm/Ds)<RSm<about 0.9 (DMm/Ds), 0.5 (DMm/Ds)<RSm<about 0.9 (DMm/Ds), 0.6 (DMm/Ds)<RSm<about 0.9 (DMm/Ds), 0.5 (DMm/Ds)<RSm<about 0.7 (DMm/Ds), 0.4 (DMm/Ds)<RSm<about 0.7 (DMm/Ds), or 0.6 (DMm/Ds)<RSm<about 0.8 (DMm/Ds), among other ranges. In the foregoing and below statements, "DMm/Ds" means DMm or Ds. If Ds is used, then Ds may be such that 100%, about 98%, about 95%, about 90%, about 85% or about 80% of the niter particles have their contact minimized, among other ranges. In some embodiments, Ra>about 0.5 (DMm/Ds), Ra>about 0.4 (DMm/Ds), Ra>about 0.8 (DMm/Ds)>Ra>0.3 (DMm/Ds), 0.7 (DMm/Ds)>Ra>0.3 (DMm/Ds), 0.6 (DMm/Ds)>Ra>0.3 (DMm/Ds), or 0.5 (DMm/Ds)>Ra>0.3 (DMm/Ds), among other ranges. Each of these ranges of Ra may be used with any of the ranges above for RSm.

In some embodiments, RSm may be in a range of about 2 μm to about 7 μm, in a range of about 5 μm to about 7 μm, or in a range of about 5 μm to about 6.5 μm, among others. In some embodiments, Ra may be in a range of about 2 μm to about 7 µm, in a range of about 3 µm to about 7 µm, or in a range of about 3.2 µm to about 6.3 µm, among others. Each of these Ra ranges may be associated with any of the foregoing RSm ranges. In some embodiments, the RSm values and ranges in this paragraph are applicable to a Ds or DMm of about 10 µm.

Figure 2:
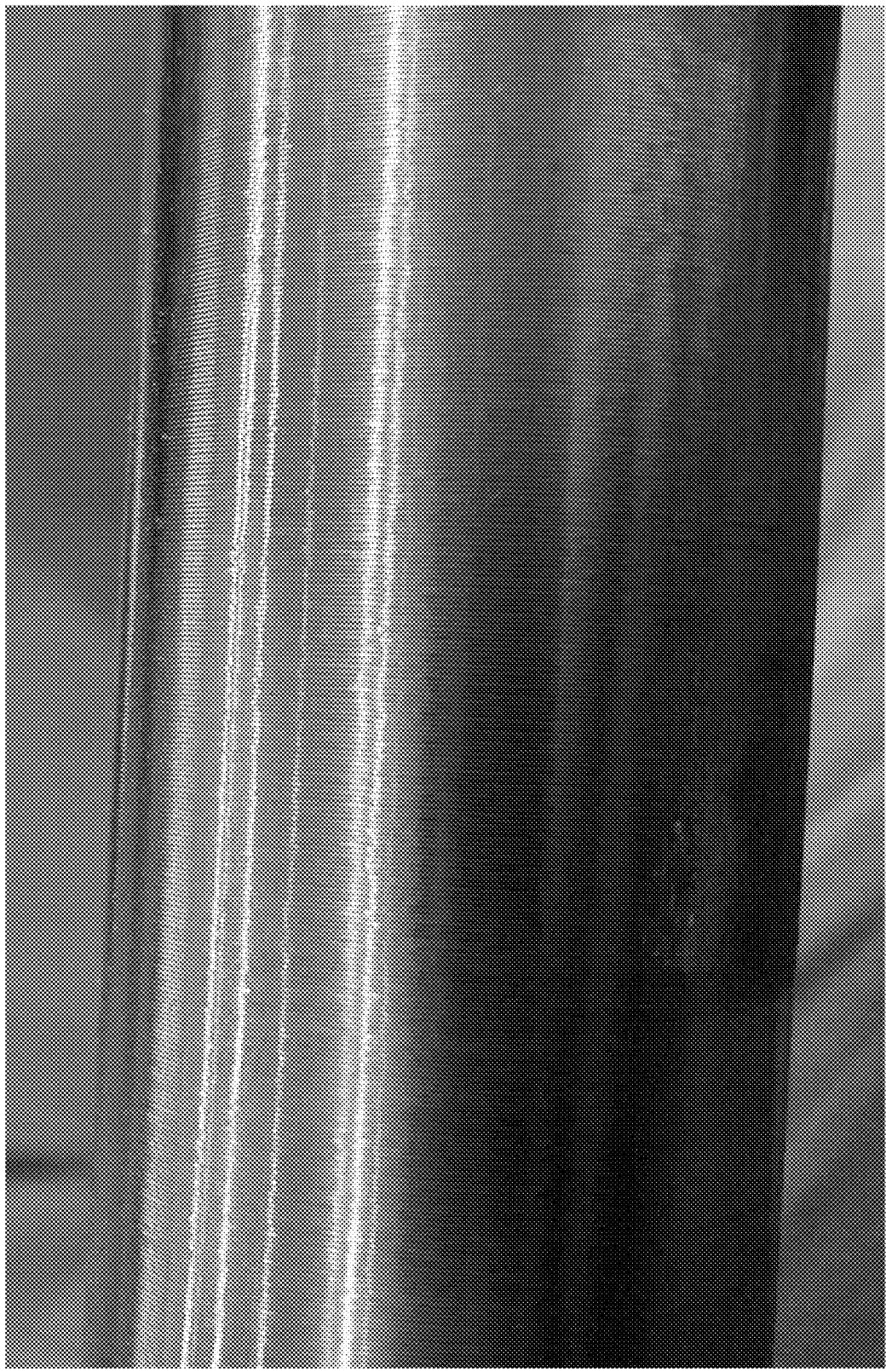
FIG. 2 is a photograph of an outer surface of a piece of metal tubing, showing the outer surface machined so as to have a ridge-and-valley type of anti-niter-buildup surface texture.

As discussed above, an anti-niter-buildup texture, such as may be idealized in FIG. 1A, may be provided to the surface of an element in any suitable manner. For example, an element having an initially smooth surface may be processed to provide the anti-niter-buildup texture in any one or more of a variety of ways. In some embodiments, the smooth surface may be machined, such as to provide the surface with a plurality of peaks and valleys, which may be parallel to one another or crisscross one another to provide a knurled effect. The term "machining" includes any suitable type of machining, such as cutting-tool machining, electrical-discharge machining, and laser-machining, among others. The longitudinal axes of individual ones of the peaks and valleys can run in any desired direction. In the context of a tube/pipe style heating conduit, such direction may be, for example, circumferentially around the heating conduit, parallel to the longitudinal axis of the heating conduit, or at an angle skewed to both of those directions. FIG. 2 is a photograph of a cylindrical heating conduit 200 having an anti-niter-buildup texture provided by circumferential grooves that define circumferentially extending peaks and valleys, a transverse cross-section through which may look like the texture features shown in FIGS. 1A and 1B. These grooves were formed by cutting-tool machining.

Figure 3:
FIG. 3 is a photograph of an outer surface of another piece of metal tubing, showing the outer surface shot-peened so as to have an irregularly dimpled type of anti-niter-buildup surface texture.

Other examples of providing anti-niter-buildup texture to an initially smooth surface of an element include, but are not limited to, using a threading-type die (e.g., for tube/pipe-type heating conduit), impacting with a texturing tool (e.g., having a texturing profile that is a negative of the desired anti-niter-buildup texture), abrading (e.g., with a course-grit wheel or sandpaper, etc.), blasting (e.g., with particles and/or shot, etc.), and etching, among others. In many cases, the texture formed by these methods may not result in uniform texture profiles. For example, FIG. 3 illustrates an anti-niter-buildup texture formed by shot-peening a heating conduit 300 having a circular transverse cross-sectional shape. However, the general characteristic of minimizing/reducing the contact area by proving a texture profile that causes a niter particle to contact the textured surface at a few discrete and few contact regions (e.g., inter-groove peaks, knurl peaks, and/or other types of peaks or high spots) such as idealized and illustrated in FIGS. 1A and 1B, still applies.

As mentioned above, the sizes of the niter particles that precipitate out of a sap/syrup may vary. Such variation may depend on one or more variables such as the type of sap/syrup (e.g., maple versus birch), the makeup of the starting sap (e.g., may vary by geographic region where the sap-producing plants (e.g., trees) grow, the weather conditions the plants experienced prior to tapping, and/or local soil conditions, among others), and the heating conditions (e.g., rapidity of heating, temperature of the heating conduit, working pressure of the sap/syrup, etc.). Consequently, a texture profile that works for one deployment may not work for another deployment, and design of an effective anti-niter-buildup-texture profile may need to be predicated on a suitable analysis of the niter precipitates in terms of size and perhaps also shape, among other things. Those skilled in the art will readily appreciate that such analysis would involve only routine testing and no undue experimentation, as methods for determining particle size and shape and for conducting any necessary experimental sap "boils" are well known in the art.

Alternatively to processing an initially smooth surface to provide the desired anti-niter-buildup texture, the anti-niter-buildup texture may be provided in another way. For example, the anti-niter-buildup coating may be provided as a coating, such as a coating containing particles that cause the dried coating to have the requisite surface profile. As another example, an element may be cast or otherwise formed in a manner that the desired anti-niter-buildup texture is formed into the element. In a further example, the anti-niter-buildup texture may be provided by covering or wrapping an element (e.g., a tube/pipe-like heating conduit) with a suitable wrapping material, such as a thin metal filament that is wound around the heating conduit or a textured foil wrapped around the conduit. In the case of a heating conduit or other heating element, any material applied to the conduit/element to provide the desired anti-niter-buildup texture and the manner in which it is provided should typically be selected to minimize the impact on the heat-transfer rate between the heating fluid within the heating conduit/element and the sap/syrup during use.

Example Evaporators

Figure 4:
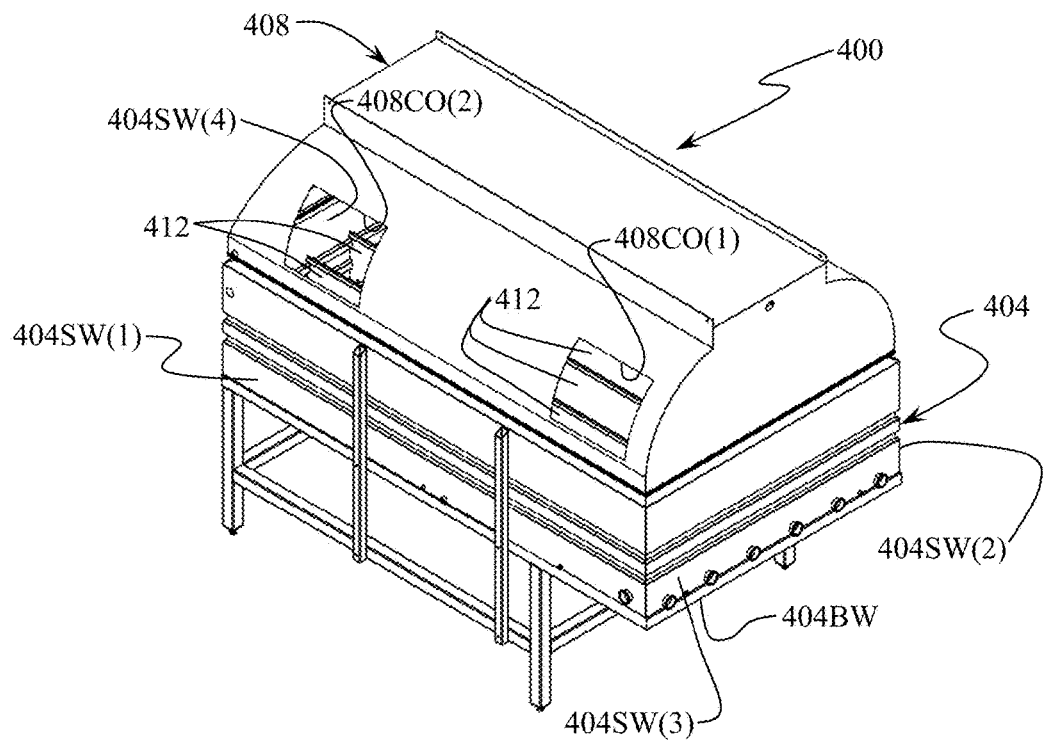
FIG. 4 is an isometric view of a sap evaporator that includes a pan-style vessel that contains submergence-type heating conduits having outer surfaces provided with one or more anti-niter-buildup textures.
Figure 5:
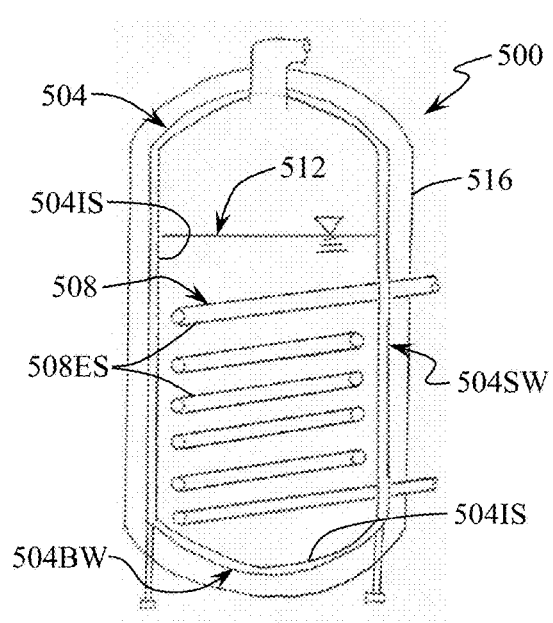
FIG. 5 is a vertical cross-sectional view of another sap evaporator that includes a tank-style vessel containing a submergence-type heating coil having an outer surface provided with one or more anti-niter-buildup textures.
Figure 6:
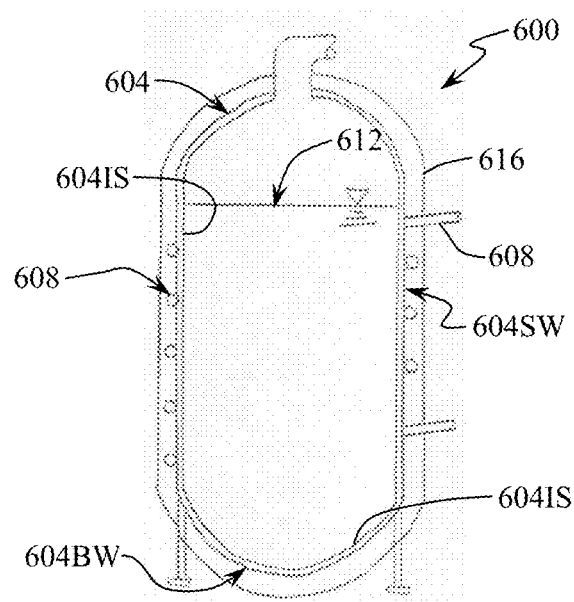
FIG. 6 is a vertical cross-sectional view of yet another sap evaporator that includes an external-type heating coil around a vessel having interior walls provided with one or more anti-niter-buildup textures.

FIGS. 4-6 illustrate various examples of evaporators 400, 500, and 600 for making syrup from sap. As described below, each of these evaporators 400, 500, and 600 includes at least one element that includes at least one anti-niter-buildup texture of the present disclosure, such as any of the anti-niter-buildup texture described above. Those skilled in the art of syrup-making are well-versed in evaporators and other syrup-making equipment and, so, readily appreciate that these example evaporators are merely illustrative and non-limiting. In addition, due to such familiarity, the following descriptions of the example evaporators 400, 500, and 600 are intentionally brief so as to describe salient features.

The example evaporator 400 of FIG. 4 comprises a pan-type vessel 404 for holding sap/syrup (not shown) during the heating process that concentrates the non-water components of the sap as the water in the sap/syrup evaporates. Also shown is a cover 408 covering the vessel 404. In this example, the vessel 404 is a divided vessel having five dividers 412 (three visible in cover opening 408CO(1) and two of the same ones visible in cover opening 408CO(2)) that define six interior channels (not labeled) therebetween and between the outer ones and the sidewalls 404SW(1) and 404SW(2) of the vessel. When sap/syrup is present, interior portions of the vessel 404 (e.g., sidewalls 404SW(1) through 404SW(4) and bottom wall 404BW) and portions of the dividers are submerged in the sap/syrup, and at least the submerged surfaces of some or all of these elements may include one or more anti-niter-buildup textures of the present disclosure (not seen because of size regime of the anti-niter-buildup texture(s)), such as any of the anti-niter-buildup textures described above. However, in other embodiments, some of all of these elements may not be provided with any anti-niter-buildup texture, for example, if any is known or suspected to not experience niter build-up during operation. For example, niter build-up may only be an issue with hotter surfaces, such as the surfaces of the submerged heating conduits as discussed immediately below.

Not seen are submergence-type heating conduits that carry a heating fluid, such as steam, during operation of the evaporator 400 and that are located toward the bottom of the inside of the vessel 404, for example, in some or all of the channels defined by the dividers 412. Although not seen, the heating conduits may be the same as or similar to the example heating conduits 200 and 300 of FIGS. 2 and 3, respectively. The exterior surfaces of the heating conduits in the vessel 404 of FIG. 4 that are submerged in the sap/syrup during operation of the evaporator are provided with one or more of the anti-niter-buildup textures (not seen because of size regime of the anti-niter-buildup texture(s)) of the present disclosure, such as any of the anti-niter-buildup textures described above. It is noted that while the heating elements of this example are of the fluid-carrying conduit type, in other embodiments another type of heating element, such as an electrically resistive type, may be used.

The example evaporator 500 of FIG. 5 comprises a cylindrical tank-type vessel 504 and a submergence-type internal heating coil 508 submerged in sap/syrup 512 during operation of the evaporator. The tank-type vessel 504 comprises a sidewall 504SW and a bottom wall 504BW that together define an interior surface 504IS of the vessel that is at least partially submerged in the sap/syrup 512 during operation of the evaporator 500. The heating coil 508, may be, for example of the fluid-carrying type that carries a heating fluid, such as steam, during operation of the evaporator 500 or an electrically resistive type, has an exterior surface 508ES submerged in the sap/syrup 512. In some embodiments of this example, the interior surface 504IS of the side and bottom walls 504SW and 504BW and the exterior surface 508ES of the heating coil 508 have one or more anti-niter-buildup textures (not seen because of size regime of the anti-niter-buildup texture(s)) of the present disclosure, such as any of the anti-niter-buildup textures described above.

In some embodiments of this example, the interior surface 504IS of the side and bottom walls 504SW and 504BW may not need to include any anti-niter-buildup texture if niter does not tend to build-up on this surface. When provided, any anti-niter-buildup texture (not seen because of size regime of the anti-niter-buildup texture(s)) may be provided only at regions of the interior surface 504IS of the vessel 504 and/or the exterior surface 508ES of the heating coil 508 that will be submerged in the sap/syrup 512 and/or that are anticipated to experience niter build-up during operation of the evaporator 500. Alternatively, regions of the interior surface 504IS and/or exterior surface 508ES that are never submerged in the sap/syrup 512 and/or are otherwise not anticipated to experience niter build-up may include one or more anti-niter-buildup textures, for example, if it is more economical to product the corresponding element(s) that way. Thermal insulation 516 surrounding the vessel 504 is also shown in FIG. 5.

The example evaporator 600 of FIG. 6 comprises a cylindrical tank-type vessel 604 and an external heating coil 608 coiled around the exterior of the vessel. The tank-type vessel 604 comprises a sidewall 604SW and a bottom wall 604BW that together define an interior surface 604IS of the vessel that is at least partially submerged in sap/syrup 612 during operation of the evaporator 600. In this example, the heating coil 608, which is of the type that carries a heating fluid, such as steam, during operation of the evaporator 600 or is of the electrically resistive type, is not exposed to the sap/syrup 612 because it is located outside of the vessel 604. However, the interior surface 604IS of the side and bottom walls 604SW and 604BW is partially submerged in the sap/syrup 612 and, therefore, has one or more anti-niter-buildup textures (not seen because of size regime of the anti-niter-buildup texture(s)) of the present disclosure, such as any of the anti-niter-buildup textures described above.

In some embodiments, the interior surface 604IS of the bottom wall 604BW may not need to include any anti-niter-buildup texture if niter does not tend to build-up on this surface because it is away from the hotter portion of the interior surface at the sidewall 604SW where the heating coil 608 is located. When provided, any anti-niter-buildup texture (not seen because of size regime of the anti-niter-buildup texture(s)) may be provided only at regions of the interior surface 604IS of the vessel 604 that will be submerged in the sap/syrup 612 and/or that are anticipated to experience niter build-up during operation of the evaporator 600. Alternatively, regions of the interior surface 604IS that are never submerged in the sap/syrup 612 and/or are otherwise not anticipated to experience niter buildup may include one or more anti-niter-buildup textures, for example, if it is more economical to produce the corresponding element(s) that way. Thermal insulation 616 surrounding the vessel 604 is also shown in FIG. 6.

In some aspects, the present disclosure is directed to methods of building an evaporator for making syrup from sap. In some embodiments, the method includes providing an element having an anti-niter-buildup texture based on an ability of the anti-niter-buildup texture to inhibit bonding of niter to the element, and then installing the element into an evaporation vessel. The element may be any of the elements mentioned above, and the anti-niter-buildup texture may be any of the anti-niter-buildup textures described above, or any logical combination thereof.

In some aspects, the present disclosure is directed to methods of making an element for use in an evaporator system configured to perform an evaporation process for making syrup from sap. In some embodiments, the method comprises providing a precursor element having an exterior surface, and providing the exterior surface with an anti-niter-buildup texture designed and configured to inhibit niter from bonding to the heating conduit during the evaporation process when the element is submerged in the sap. The precursor element may be any precursor to any of the elements mentioned above, and the anti-niter-buildup texture may be any of the anti-niter-buildup textures described above, or any logical combination thereof.

In some aspects, the present disclosure is directed to elements for use in an evaporation system configured to perform an evaporation process for making syrup from sap. In some embodiments, the element includes a body and an exterior surface that will be submerged in the sap during the evaporation process and that includes at least one anti-niter-buildup texture designed, configured, and provided to inhibit niter from bonding to the surface during the evaporation process. The body may be any precursor to any of the elements mentioned above, and each of the at least one anti-niter-buildup texture may be any of the anti-niter-buildup textures described above.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An evaporator for making syrup from sap, the evaporator comprising:
   a vessel for containing the sap during heating of the sap during an evaporation process for concentrating the sap to syrup; and
   an element that has a surface submerged in, and in contact with, the sap during the evaporation process, wherein the surface has an anti-niter-buildup texture designed, configured, and provided to inhibit niter from bonding to the surface during the evaporation process;
   wherein:
   the niter is composed of niter particles, and the anti-niter-buildup texture is designed, configured, and provided to control an amount of contact between the niter particles and the surface; and
   the anti-niter-buildup texture has features designed so that each niter particle contacts no more than two of the features.

2. The evaporator of claim 1, wherein the element is a heating element for providing heat to the sap in the vessel during the evaporation process, and the surface is an external surface of the heating element.

3. The evaporator of claim 2, wherein the heating element is a heating conduit that carries a heating fluid during the evaporation process.

4. The evaporator of claim 2, wherein the heating element is an electrically resistive heating element.

5. The evaporator of claim 1, wherein the element is a wall of the vessel.

6. The evaporator of claim 1, wherein the element is an internal divider within the vessel.

7. The evaporator of claim 1, wherein the anti-niter-buildup texture comprises features defined by machining the surface.

8. The evaporator of claim 1, wherein the anti-niter-buildup texture comprises features defined by an impact method.

9. The evaporator of claim 1, wherein the anti-niter-buildup texture comprises features defined by added particles.

10. The evaporator of claim 1, wherein the anti-niter-buildup texture comprises features defined by etching.

11. The evaporator of claim 1, wherein the anti-niter-buildup texture has a surface profile that has a mean peak width, RSm, and the niter has particles having a mean minimum particle size, DMm, wherein RSm is less than about DMm.

12. The evaporator of claim 1, wherein the anti-niter-buildup texture has a surface profile that has a mean peak width, RSm, and the niter has particles having a minimum particle size, Ds, wherein RSm is less than about Ds.

13. The evaporator of claim 1, wherein the anti-niter-buildup texture has a surface profile that has an arithmetic mean roughness value, Ra, and the niter has particles having a mean minimum particle size, DMm, wherein Ra is less than about 0.5 DMm.

14. The evaporator of claim 1, wherein the anti-niter-buildup texture has a surface profile that has an arithmetic mean roughness value, Ra, and the niter has particles having a minimum particle size, Ds, wherein Ra is less than about 0.5 Ds.

15. An evaporator for making syrup from sap, the evaporator comprising:
   a vessel for containing the sap during heating of the sap during an evaporation process for concentrating the sap to syrup; and
   an element that has a surface submerged in, and in contact with, the sap during the evaporation process, wherein the surface has an anti-niter-buildup texture designed, configured, and provided to inhibit niter from bonding to the surface during the evaporation process;
   wherein the anti-niter-buildup texture has a surface profile that has a mean peak width, RSm, and the niter has particles having a mean minimum particle size, DMm, wherein RSm is less than about DMm.

16. The evaporator of claim 15, wherein RSm is less than about 0.9 DMm.

17. The evaporator of claim 15, wherein RSm is in a range of about 2 μm to about 7 μm.

18. The evaporator of claim 15, wherein DMm is about 10 μm.

19. An evaporator for making syrup from sap, the evaporator comprising:
   a vessel for containing the sap during heating of the sap during an evaporation process for concentrating the sap to syrup; and
   an element that has a surface submerged in, and in contact with, the sap during the evaporation process, wherein the surface has an anti-niter-buildup texture designed, configured, and provided to inhibit niter from bonding to the surface during the evaporation process;
   wherein the anti-niter-buildup texture has a surface profile that has a mean peak width, RSm, and the niter has particles having a minimum particle size, Ds, wherein RSm is less than about Ds.

20. The evaporator of claim 19, wherein RSm is less than about 0.9 Ds.

21. An evaporator for making syrup from sap, the evaporator comprising:
   a vessel for containing the sap during heating of the sap during an evaporation process for concentrating the sap to syrup; and
   an element that has a surface submerged in, and in contact with, the sap during the evaporation process, wherein the surface has an anti-niter-buildup texture designed, configured, and provided to inhibit niter from bonding to the surface during the evaporation process;
   wherein the anti-niter-buildup texture has a surface profile that has an arithmetic mean roughness value, Ra, and the niter has particles having a mean minimum particle size, DMm, wherein Ra is less than about 0.5 DMm.

22. An evaporator for making syrup from sap, the evaporator comprising:
   a vessel for containing the sap during heating of the sap during an evaporation process for concentrating the sap to syrup; and
   an element that has a surface submerged in, and in contact with, the sap during the evaporation process, wherein the surface has an anti-niter-buildup texture designed, configured, and provided to inhibit niter from bonding to the surface during the evaporation process;
   wherein the anti-niter-buildup texture has a surface profile that has an arithmetic mean roughness value, Ra, and the niter has particles having a minimum particle size, Ds, wherein Ra is less than about 0.5 Ds.

\* \* \* \* \*